United States Patent [19]
Kitamura

[11] Patent Number: 5,987,106
[45] Date of Patent: Nov. 16, 1999

[54] AUTOMATIC VOLUME CONTROL SYSTEM AND METHOD FOR USE IN A MULTIMEDIA COMPUTER SYSTEM

[75] Inventor: John S. Kitamura, Toronto, Canada

[73] Assignee: ATI Technologies, Inc., Thornhill, Canada

[21] Appl. No.: 08/881,459

[22] Filed: Jun. 24, 1997

[51] Int. Cl.[6] .................................................. H04M 1/00
[52] U.S. Cl. .............................. 379/110.01; 379/102.02; 379/102.03
[58] Field of Search .......................... 379/102.01, 102.02, 379/102.03, 110.01; 381/104, 107, 108, 106; 455/461, 456; 348/14, 738

[56] References Cited

U.S. PATENT DOCUMENTS

| 4,734,764 | 3/1988 | Pocock et al. . |
| 4,751,578 | 6/1988 | Reiter et al. . |
| 4,910,779 | 3/1990 | Cooper et al. . |
| 5,014,125 | 5/1991 | Pocock et al. . |
| 5,086,385 | 2/1992 | Launey et al. . |
| 5,128,987 | 7/1992 | McDonough et al. ................... 348/738 |
| 5,192,999 | 3/1993 | Graczyk et al. . |
| 5,283,819 | 2/1994 | Glick et al. . |
| 5,375,160 | 12/1994 | Guidon et al. . |
| 5,438,623 | 8/1995 | Begault . |
| 5,553,122 | 9/1996 | Haber et al. . |
| 5,559,860 | 9/1996 | Mizikovsky . |
| 5,594,509 | 1/1997 | Florin et al. . |
| 5,602,928 | 2/1997 | Eriksson et al. . |
| 5,870,453 | 2/1999 | Shapiro ............................. 379/102.03 |

FOREIGN PATENT DOCUMENTS

| 407050710 | 2/1995 | Japan .............................. H04M 1/00 |
| 407273845 | 10/1995 | Japan .............................. H04M 1/00 |

Primary Examiner—Curtis A. Kuntz
Assistant Examiner—Melur Ramakrishnaiah
Attorney, Agent, or Firm—Markison & Reckamp, P.C.

[57] ABSTRACT

An automatic volume control system and method for use in a multimedia computer system having at least one speaker and at least one audio generating device accumulates a status of the audio generating device to determine if it is on or off. The system recognizes an audio mute event notification signal from a notification device, such as an incoming telephone call notification signal, and selectively generates a control signal for use in varying the volume to the at least one speaker in response to the detection of the notification signal to selectively control audio from the audio generating device. The system also accommodates multiple audio generating devices. The system analyzes the location of the telephone, speakers and audio generating devices to determine the type of action that is necessary.

22 Claims, 5 Drawing Sheets

FIG. 5

AUTOMATIC VOLUME CONTROL SYSTEM AND METHOD FOR USE IN A MULTIMEDIA COMPUTER SYSTEM

The invention relates generally to computer controlled audio muting or volume control systems and more particularly to computer controlled audio muting or volume control systems for multimedia computer systems having telephone call management features and multiple audio generating sources.

BACKGROUND OF THE INVENTION

Conventional multimedia computer systems typically have speakers for limited stereo audio capabilities. The user can manually adjust volume control and can have limited manual equalization adjustment capabilities for on-board CD players or television cards. Such systems may also allow for manual adjustment of volume control for personal computer based telephone answering systems. Known television cards for personal computers typically route the television audio signals directly to the television speakers without providing any audio control.

Standards are being developed for universal serial bus (USB) hub controllers that multiplex differing buses to interface with a computer. With such USB's, many devices can be connected to a personal computer. Where a single multimedia computer system controls multiple audio generating devices that are not necessarily on-board the computer, such as CD players, digital versatile or video disc (DVD's) players, VCR's, and television monitors, the location of each audio generating device can vary such that the devices can be in separate rooms throughout a home or office building. Where multiple speakers are coupled to the computer through an audio card, groups of speakers can also be located in different locations throughout the home or office building. Also, facsimile/modem and telephone answering systems can also be connected to the computer where different telephone lines can be coupled through a common modem in a computer.

When multiple audio generating devices are operational, such as when a movie is being watched on a DVD player in one room and a television is being watched in another room, and the telephone rings, the volume from the movie (speakers) or television can often be excessively loud so that the ring is not heard. Also, if the ring is heard, a person wishing to converse on the telephone has to manually reduce the volume or leave the room with the telephone to avoid being inundated by the loud audio. The problem is compounded when multiple telephones are located in a home or office building and multiple audio generating devices can be operational at the same time.

Consequently, there exists a need for an automatic volume control/pause control system and method for use in multimedia computer systems that substantially overcomes one or more of these problems. It would be advantageous if such a system could selectively generate an audio volume control signal for any of a determined number of audio generating devices upon detection of an audio mute notification signal. In addition, such a system should be able to determine which telephone is ringing to determine whether volume control should be instituted. When the volume must be controlled, the system should also determine whether the volume should be adjusted or whether another volume control mechanism should be employed. Moreover, the system should recognize priority incoming calls as requiring differing volume control strategies.

BRIEF DESCRIPTION OF THE DRAWINGS

The features of the present invention together with the advantages thereof, may be understood by reference to the following description taken in conjunction with the accompanying drawings wherein:

FIGS. 4a and 4b show a flow diagram generally depicting one embodiment of a method for obtaining multimedia status information for use with the multi-audio/volume and pause control system of FIG. 2 in accordance with the invention.

DETAILED DESCRIPTION OF THE INVENTION

The disclosed automatic volume control system selectively controls audio being generated by one or more audio generating devices so that when a telephone call arrives, or other audio mute event occurs, the audio from a selected one of the multimedia devices is suitably muted so that the call can be properly serviced.

Figure 1:
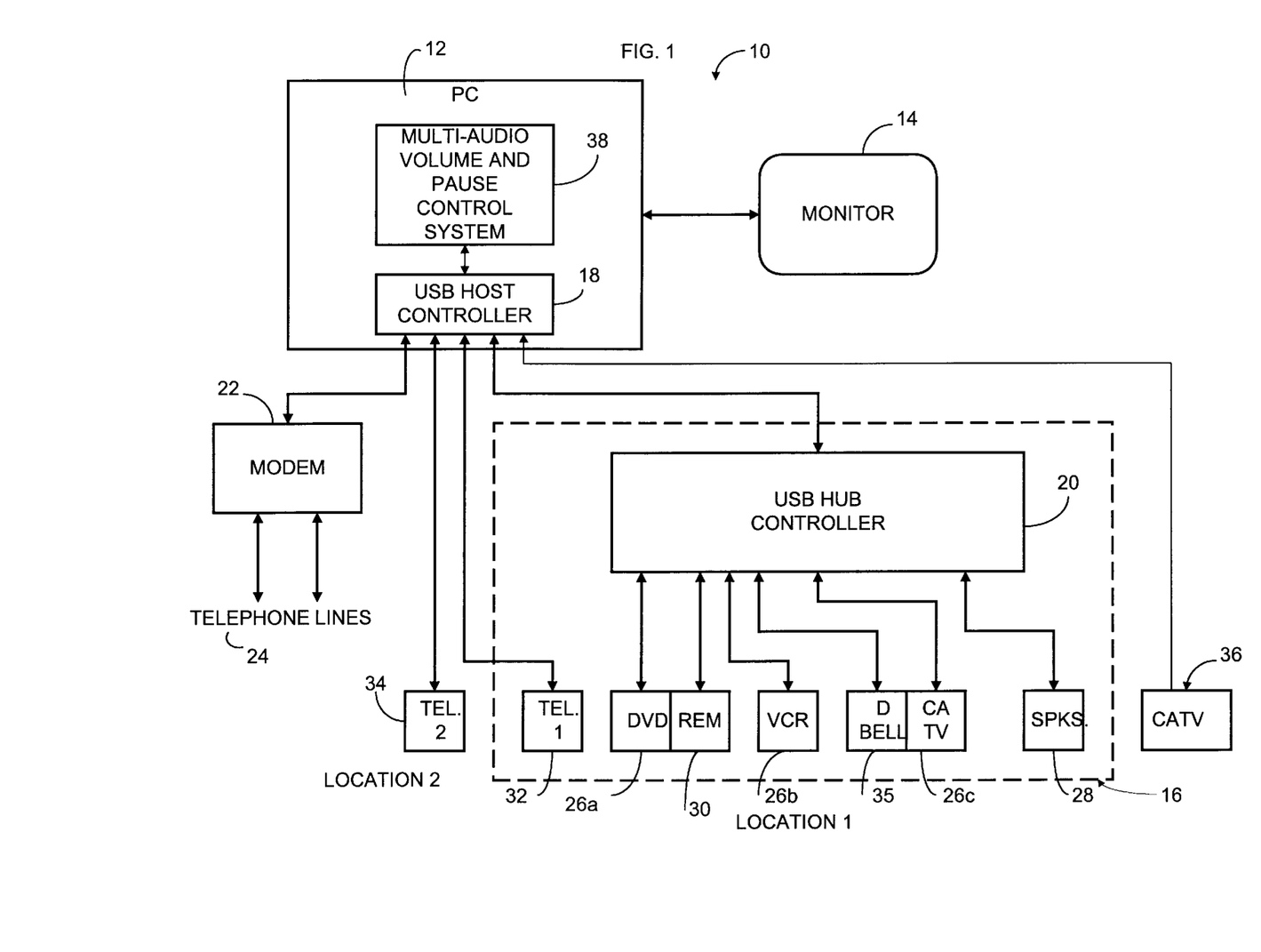
FIG. 1 is a block diagram generally depicting a personal computer based multimedia system having audio generating devices located in different locations and further having a multi-audio volume and pause control system in accordance with one embodiment of the invention.

FIG. 1 shows one example of a multimedia computer system for 10, configured with multiple audio generating devices and telephones routed through the computer system 10, which may be located in several rooms in a home or office. The multimedia computer system 10 includes a personal computer 12 having an associated monitor 14. The personal computer 12 serves as the main controller of the various peripheral devices, generally indicated by arrow 16, through the use of one or more universal serial bus (USB) controllers 18 and 20. The USB controller 18 serves as a host controller whereas the USB controller 20 serves as a hub controller. Since the multimedia computer system 10 is merely one example for purposes of illustration, it will be recognized by those of ordinary skill in the art that the multimedia computer system 10 need not have universal serial bus hub controllers 18 or 20 but may merely have another interface arrangement to communicate with peripheral devices 16 such as another multiplexing system or a direct connection to a personal computer interface bus.

As known in the art, the USB controllers 18 and 20 serve as a type of multiplexer to multiplex control and data information from varying types of devices to the personal computer 12. Also as shown, the multimedia computer system 10 may have a modem 22 for communicating over a number of telephone lines 24. The modem 22 may be a card within the personal computer 12 or a standalone unit. Likewise, the USB controllers 18 and 20 can also be cards within the personal computer or standalone units. Similarly the peripheral devices 16 can also be integrated into the personal computer 12 if desired.

The peripheral devices 16 include a plurality of audio generating devices such as a digital video disc playback unit 26a, a VCR unit 26b and a television set 26c. Although not shown, any other desired audio generating devices may also be used. The PC 12 controls the audio for each audio generating device 26a–26c. Other peripheral devices are speakers 28 that receive audio signals from the DVD playback unit 26a, from a TV card (see FIG. 2) in the PC 12 and from the VCR 26b. A user interface such as a remote control unit 30 also sends control signals to the PC to activate and control the VCR, 26b, TV 26c, or DVD 26a and serves as a peripheral device.

Another peripheral device 16 may be a telecommunications unit 32, such as a telephone. The telecommunications unit 32 communicates to the PC through the USB host controller 18. The personal computer 12 also serves as a phone answering and interface system and provides graphic and text output either on monitor 14 or on TV monitor 26c to allow the user to interface with the telephone communication features such as selecting caller-id options, programming quick-call telephone numbers and other standard telephone functions.

For purposes of illustration, the digital video disc playback unit 26a, the VCR 26b, and the television unit 26c and the speakers 28 are located in the same room in the home indicated as location 1. Another telecommunications unit 34, such as another telephone on a separate telephone line, may be located in a different room in the house, indicated as location 2. The telecommunications units 32 and 34 serve as audio mute event indicators by generating a signal interpreted as indicating that audio may have to be controlled. Other audio event indicators such as a doorbell 35 or any other suitable input may also be connected to the system 10.

A cable television signal from a satellite system or set top box 36 provides the television signals to the personal computer 12 which serves as a television receiver by virtue of a television receiving card. The PC 12 then transmits the television signals through the USB controllers 18 and 20 to television monitor 26c and also communicates the associated audio for the television signals through USB controller 18 and 20 to speakers 28. Therefore, the multimedia computer system 10 facilitates control of audio among a number of audio generating units under control of the personal computer 12.

For example, a user desiring to watch a movie may play a DVD on DVD playback unit 26a. The PC 12 through USB controller 20 receives the DVD audio and video signals. The PC 12 routes the audio signals to the speakers 28 and the video signals to TV monitor 26a or monitor 14. A similar scenario is used to route audio and video signals from the VCR to the speakers 28 and TV monitor 26c or monitor 14. When telecommunication device 32 receives an incoming call and begins to ring in the same room as the TV monitor 26c and speakers 28, a conflict arises between the movie audio from the speaker 28 and the ring and audible response to the telephone call. To control the system during such an occurrence, the PC 12 also includes a multi-audio/volume and pause control system 38 which selectively controls volume by reducing audio volume or muting audio being output by any one of the audio generating devices 26a through 26c when an audio mute event notification signal from a notification device, such as an incoming call from telecommunication device 32 or telecommunication device 34 is detected.

Figure 2:
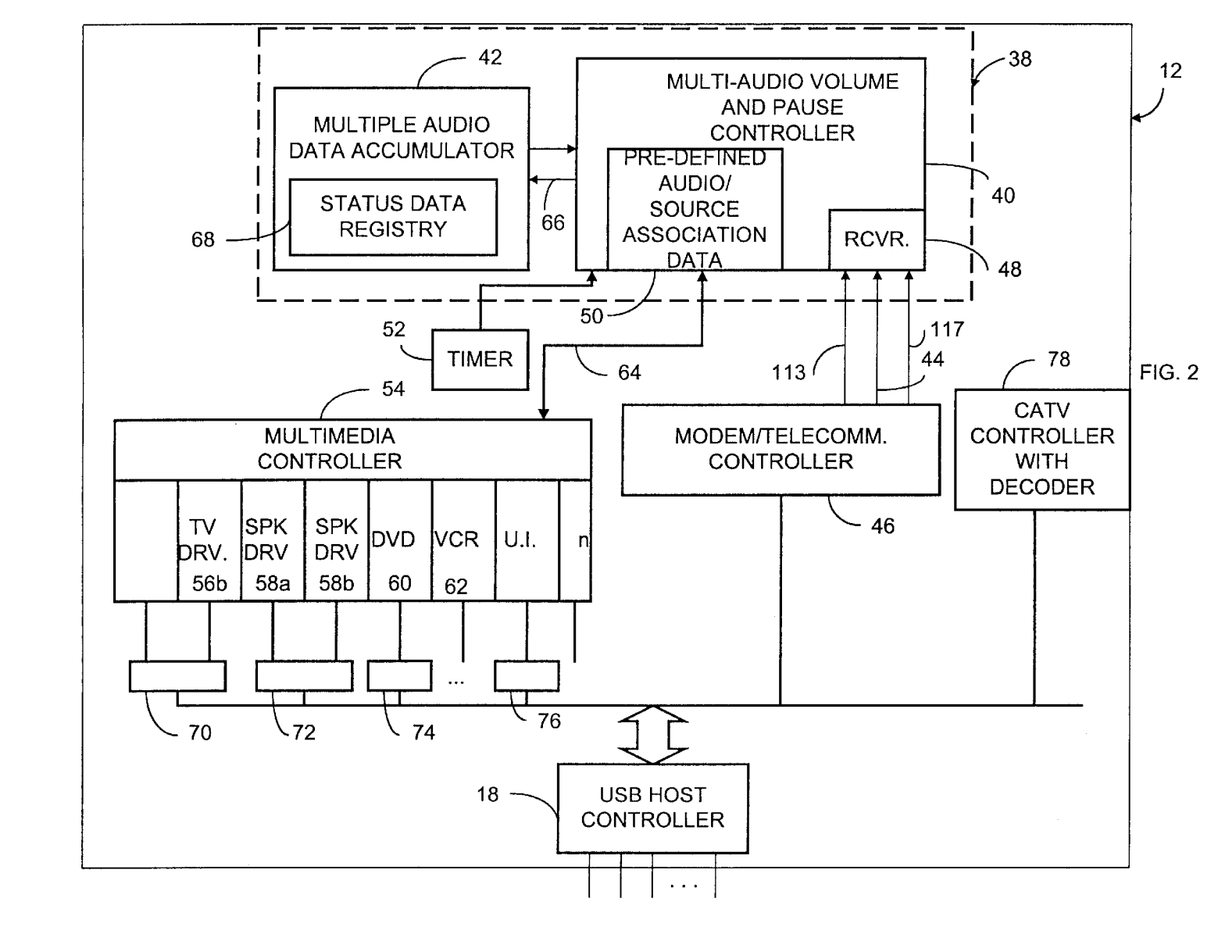
FIG. 2 is block diagram generally depicting a personal computer containing one example of the multi-audio/volume and pause control system shown in greater detail, in accordance with the invention.

FIG. 2 depicts in more detail the automatic multi-audio/volume and pause control system 38 which includes a multi-audio/volume and pause controller module 40 and a multiple-audio generator data accumulator 42. These modules are preferably software modules resident on the personal computer 12. Therefore the CPU of the PC and associated memory serve as the mechanisms for carrying out the functions of these modules.

The multi-audio/volume and pause controller 40 receives an incoming call notification signal 44 from a call detection mechanism such as a modem or telecommunications controller 46. The modem or telecommunications controller 46 may be a conventional modem or telephone interface module which generates a signal indicative that a incoming call has been received. The multi-audio/volume and pause controller module 40 receives the incoming call notification signal 44 through receiver 48.

The multi-audio/volume and pause controller 40 stores predefined audio source association data 50, such as location information for each of the peripheral devices 16, in a file or register. Predefined audio source association data 50 is prestored multi-location data stored in a preset audio data block that can also include volume level limit data. When a complete mute is not desired, the automatic volume control system 38 will reduce the audio to the volume level limit based on the detection that an incoming call has been received from one of the telecommunication devices 32 or 34.

The multiple audio generating data accumulator 42 accumulates a status, such as an on/off status, by periodically storing the status for each audio generating device present in the multimedia computer system 10. A timer 52 serves as an interrupt generator for the multi-audio/volume and pause controller 40 to provide a time base for polling each multimedia application that is present on the computer system 10. In addition to the status data, the multi-audio/volume and pause controller 40 also determines other data being communicated such as which audio generating device is connected to speaker drivers.

The multi-audio/volume and pause controller 40 provides the accumulator 42 with the polled status information by communicating with a standard multimedia controller module 54. The standard multimedia controller module 54 is a software module as known in the art that interfaces with the various drivers for the peripheral devices 16. For example, the multimedia controller 54 can activate or deactivate TV drivers 56a and 56b and left and right speaker drivers 58a and 58b, as well as any digital video disc and VCR drivers 60 and 62. Since the multimedia controller 54 selects which of the drivers is being activated, the multi-audio/volume and pause controller 40 obtains the status information through communication link 64 and stores the information by communicating through link 66 to the multiple generating data accumulator 42. The status data (environmental data) is stored in a data registry 68 that may be a file accessible by the multi-audio/volume and pause controller module 40. It will be recognized by those of ordinary skill in the art that also the above is only one example and that the various functions of both the multi-audio/volume and pause controller 40 and the accumulator 42 may be interchanged or combined. For example, the accumulator 40 could provide the polling function by being in communication with the multimedia controller 54.

The PC 12 may also include a number of peripheral device cards such as television card 70, audio card 72 DVD card 74 and user interface card 76 which provide the proper signal and control information to the respective peripheral unit through USB host controller 18. For example, television card 70 may include contrast, tint, picture within a picture and other features that may be selected by a user for communication to the TV 26c. Similarly audio card 72 may provide volume, bass, and treble control for audio being played. The personal computer 12 may also have a cable TV controller 78 with a decoder for decoding received cable signals so that the signals may be transmitted under control of the TV drivers through TV card 70 and to TV 26c.

Figure 3:
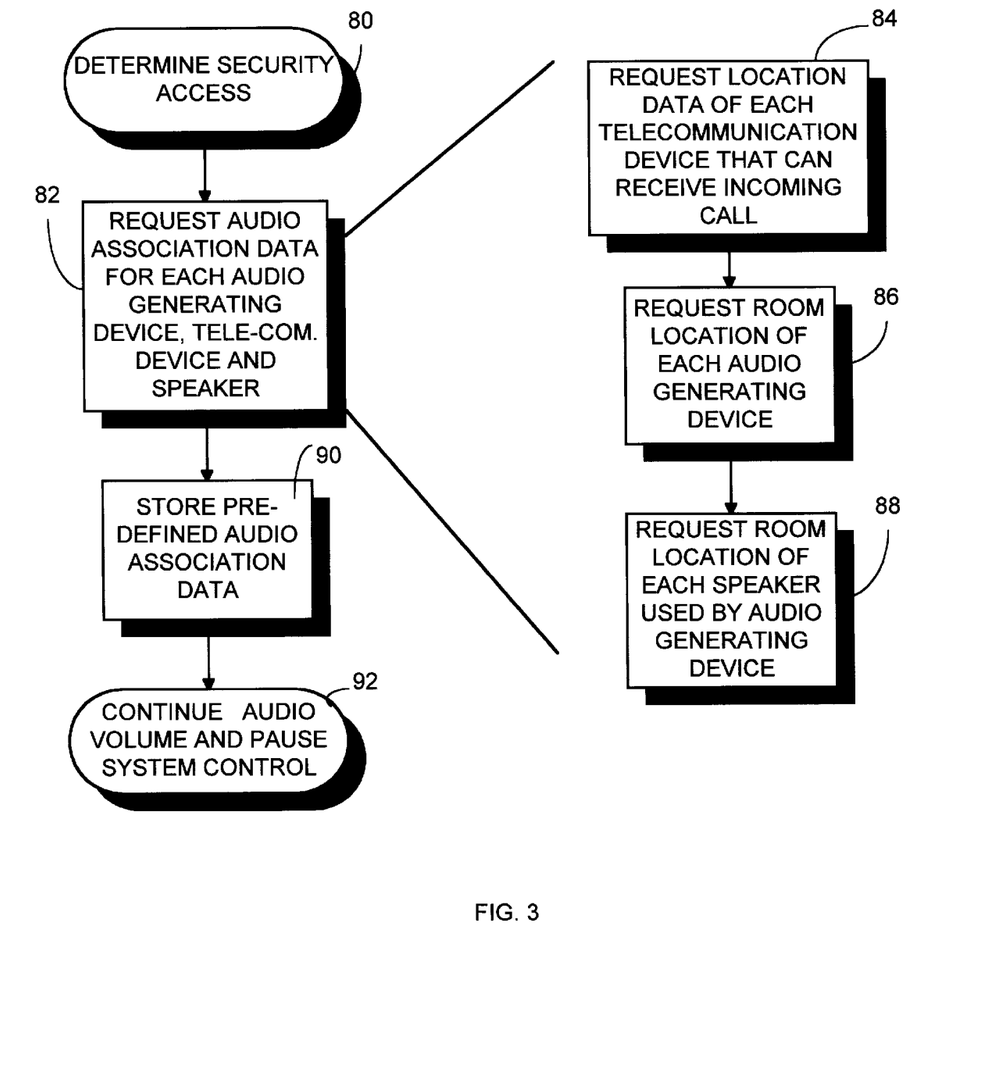
FIG. 3 is a flow diagram generally depicting the operation of the multiaudio/volume and pause control system of FIG. 2 in accordance with one embodiment of the invention.

Referring to FIGS. 2 and 3, the operation of one embodiment of the invention will be discussed. For example, where a user is watching a movie being played on a digital video disc in location 1 and telephone 32 rings in the same location, it would be desirable to automatically mute or otherwise control the volume being output by speakers 28 in the same location so that the telephone ring could be heard and a conversation could take place over the telephone in the same location without the audio from the DVD playback unit 26a being excessively loud. However, if the telephone is in another location other than where speakers 28 are located, it is likely that the audio may not be loud enough to interfere with a conversation taking place using the telephone.

The automatic volume control system 38 obtains and stores predefined audio source association data 50 as input by a user. To obtain and store association data, the multi-audio/volume and pause control system 38 verifies that the user has security access to enter association data as indicated in block 80. The automatic volume control system 38 requests the user to enter audio association data for each audio generating device in the system, for each mute event indicator and for the speakers in the system as indicated in block 82. Where the mute event indicator is a telephone or other telecommunication device, the multi-audio/volume and pause control system 38 obtains the audio association data by requesting location data of each telecommunication device that can receive incoming calls as indicated in block 84. In other words, the user is asked to identify which room each telephone is in.

Also, the multi-audio/volume and pause control system 38 requests the user to enter the room location of each audio generating device as indicated in block 86. In addition, the multi-audio/volume and pause control system requests the user to enter the room location of each speaker used by audio generating devices as indicated in block 88. Once this audio association data which associates audio generating devices with a room location, the multi-audio/volume and pause control system 38 stores this predefined audio association data in the file 50, as shown in block 90. The multi-audio/volume and pause controller 38 is then able to begin the audio/volume and pause control functions as indicated in block 92.

Figure 4A:
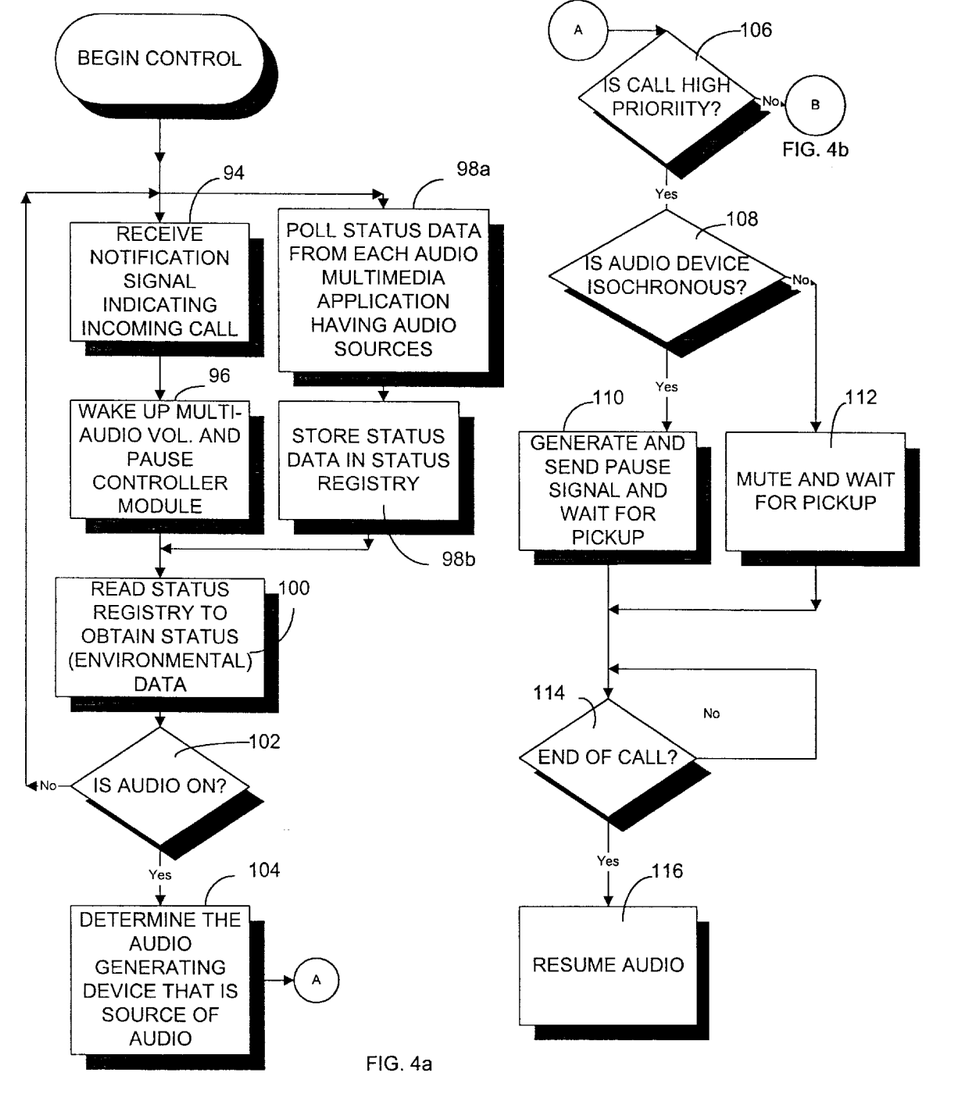

Referring to FIGS. 1, 2, and 4a the multi-audio/volume and pause control system 38 begins its control operation when it receives a call notification signal 44 from a modem controller 46 or telecommunication controller 46 as indicated in block 94. The call notification signal 44 wakes up the multi-audio/volume and pause control system 38, as indicated in block 96. The modem/telecommunication controller 46 can be suitably programmed by a user to allow certain telephone calls to have priority over others as known in the art. Other telephone options may also be selected by the user. In operation, all telephone calls are received through the modem 46 and routed to the appropriate telecommunications device 32 or 34 by the modem/telecommunication controller 46. If a user selects a call priority, the modem/telecommunication controller 46 screens incoming calls accordingly and generates the incoming call signal 44 for each telecommunications device 32 or 34. The multi-audio/volume and pause control system 38 determines which telephone generated the incoming call notification signal based on the incoming call signal.

As a continual background operation, the multi-audio/volume and pause control system 38 obtains the status information in the status data registry 68 by polling the status of the audio generating devices 26a–26c and speakers 28 through multimedia controller 54 and stores the status data in the status registry. This is indicated by blocks 98a and 98b. Once awake, the multi-audio/volume and pause control system 38 reads the status data registry 68 to find out if there are any devices in the same room as the telephone that caused the call notification signal to be generated, as indicated by block 100. If the telephone causing the notification signal is not located in a room with any audio generating devices, no volume control is carried out.

The multi-audio/volume and pause controller 40 analyzes the status data to determine if audio is on in the room with the telephone that generated the incoming call notification signal 44 as shown in block 102. If no audio is on, meaning that based on the predefined association data and status data, none of the audio generating devices are active that are in the same location, no volume or pause control is instituted. This is done by looking at the speaker drivers 56a and 58b to determine whether or not any of the speaker drivers are on. If they are not on, indicating that no audio is on, no control is effected by the multi-audio/volume and pause control system 38. If however, the multi-audio/volume and pause controller 40 determines from the status data registry that the speaker drivers 58a and 58b are on, the multi-audio/volume and pause controller 40 then determines the audio generating device that is the source of the audio by polling the multimedia controller application 54 to determine what is connected to the speakers. This is shown by block 104. Next, the multi-audio/volume and pause control system 38 determines whether the telephone call is a high priority call as shown in block 106. This is done by analyzing data in the incoming call notification signal. For example if priority call bits are set by the modem/telecommunications controller 46, the automatic volume control system 38 recognizes that the received call is a priority call.

If the call is determined to be a high priority call, meaning that audio should be muted prior to the call being picked up by the personal computer 12 or a person in the room, the multi-audio/volume and pause control system 38 determines whether the audio generating device that is generating the audio is generating audio in a non-isochronous manner. This is shown in block 108. Isochronous communication is determined by analyzing stored association data. For example, when prompting the user for the type of audio generating device, the system 10 requests that the user enter data indicating whether that the device has a pause mode. The automatic volume control system 38 accesses the data and determines if the device can be paused.

Alternatively, the automatic volume control system 38 can query the multimedia controller 54 to determine whether the device can be paused. By controlling a particular driver, the mulitmedia controller 54 knows whether the driver can enter into a pause mode.

If the audio generating device is generating audio in an isochronous manner, the control signal sent to the generating device is a pause command signal to set the audio generating device in a pause mode as opposed to reducing volume output by speaker drivers 58a and 58b. Therefore, if the audio generating device generates audio in a non-isochronous manner, the pause command will be generated and sent to the device and the system 38 will wait for the telephone to be picked up as shown in block 110. If however, the audio generating device is not generating audio in a non-isochronous manner, a volume control signal in the form of a mute or volume decrease signal will be sent to the audio generating device as shown in block 112, whereafter the system 38 will wait for a telephone pick up signal indicating the telephone is picked up.

The multi-audio/volume and pause controller 40 will monitor the receiver 48 to determine if an end call command signal 113 has been sent by the modem or telecommunications controller 46 as indicated in block 114. If no end call signal is generated, the multi-audio/volume and pause controller will continue to wait. If an end call signal is received by receiver 48, then the multi-audio/volume and pause controller will generate a resume audio signal on bus 64 to the muted or paused audio generating device to resume the same level of audio that existed prior to the received incoming telephone call as indicated in block 116.

Referring back to block 106, if the multi-audio/volume and pause control system 38 determines that the call is not a high priority call, the multi-audio/volume and pause control system 38 will wait to receive a call pickup signal 117 as indicated in block 118. If no call pickup signal is received as indicated in block 120, the modem and communication controller 46 will take a message or perform another function programmed by the telephone answering application as known in the art is indicated in block 122. If the multi-audio/volume and pause control system 38 receives a call pickup signal through receiver 48, the multi-audio/volume and pause controller 40 will again determine whether the device generating the audio can be paused or whether a mute audio signal must be generated as shown in block 108. Where the volume is controlled by reducing the volume level to a user defined preset level, the multi-audio/volume and pause control system 38 stores the previous volume setting as restore volume level data in a restore register. When the call is over, the multi-audio/volume and pause control system 38 obtains the restore volume level data as sets the volume back to the previous volume level prior to the volume control event.

To reduce the volume or mute the audio, the multi-audio/volume and pause control system 38 having the pre-stored location data relating to multiple speakers, such as speakers 28, determines which speaker is located in the location containing the device generating the audio. The multi-audio/volume and pause control system 38 then generates the control signal to selectively control the volume for the speaker located in the location contained in the device generating the audio. In this way only the speaker likely to interfere with the telephone call is selected as the speaker or speakers that are affected. Similarly the multi-audio/volume and pause control system 38 determines which speaker is located in the location containing the device generating the audio and determines which telecommunications device is receiving the incoming call based on pre-stored association data 50. The multi-audio/volume and pause control system 38 determines the location containing the device generating the audio and then generates a control signal to selectively control the volume for the speaker located in the location containing the device generating the audio when the telephone device receiving the incoming call is in the same location.

If desired, the multi-audio/volume and pause control system 38 can send a global volume control signal to all audio generating devices even if an audio generating device is not in the same room as the telecommunication unit receiving the call. This may be useful when an urgent call is expected and the user may be periodically moving from room to room.

Figure 5:
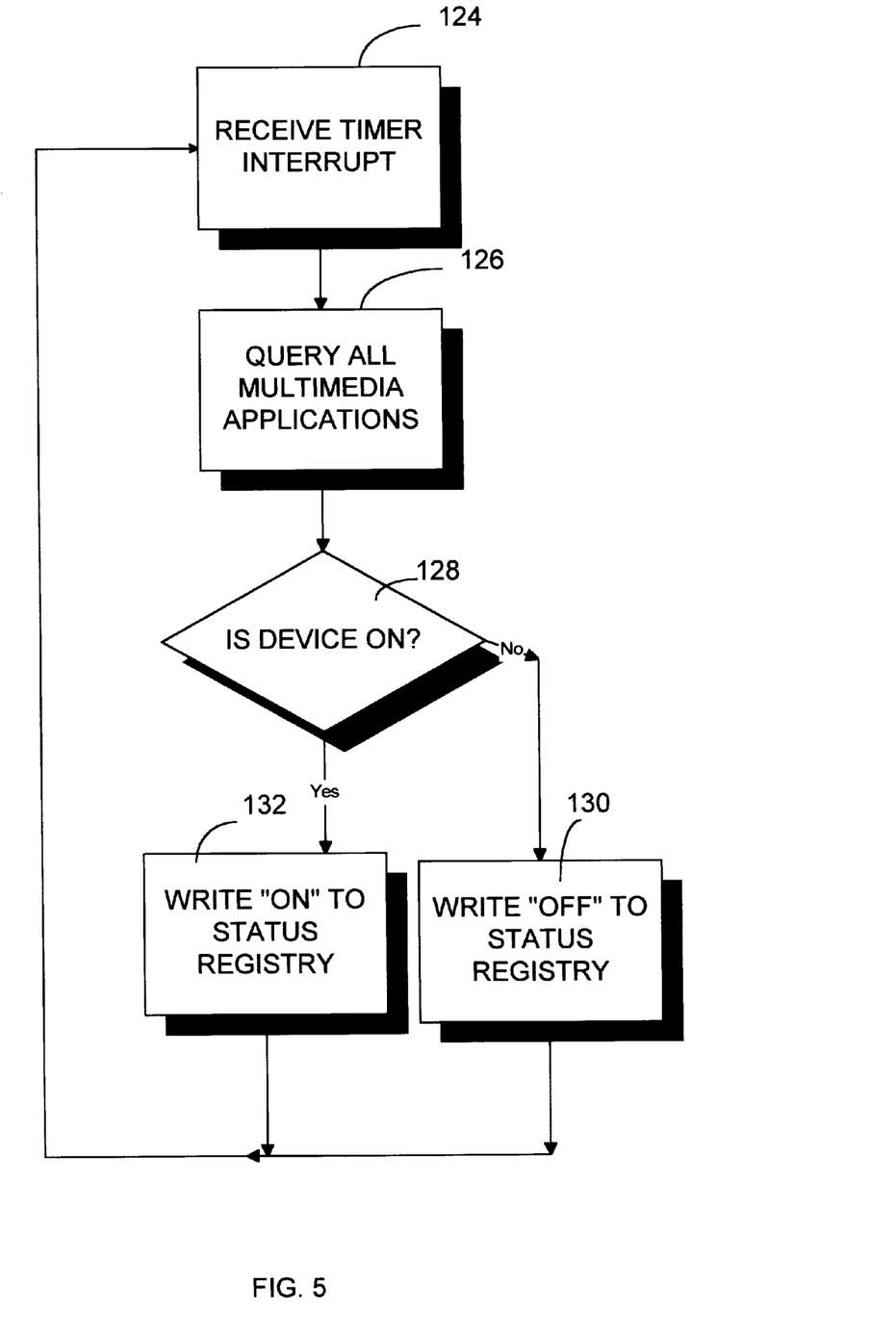
FIG. 5 is a flow diagram generally depicting one embodiment of a method for obtaining audio association data for use by the multi-audio/volume and pause control system.

Referring to FIG. 5, the multi-audio/volume and pause control system 38 uses a timer interrupt based on timer 52 which may be set at approximately every 0.5 seconds. As shown in block 124, the multi-audio/volume and pause control system 38 receives the timer interrupt. The multi-audio/volume and pause control system 38 then notifies the multi-audio/volume and pause controller 40 to query all multimedia applications to determine their status using the multimedia controller 54, as shown in block 126. The determination of the status is done for each device by determining whether the device is "on" or "off" as shown in block 128. If the device is "on," data corresponding to the status "on" is written to the data registry 68, as shown in block 130. As indicated by block 132, where the query of the multimedia applications through multimedia controller 54 indicates that the device is "off," the multi-audio/volume and pause controller will write data reflecting that the device is "off," in the data registry 68.

The process is repeated for each separate application not monitored by the multimedia controller 54. For example, if the CATC/television application is separate, the multi-audio/volume and pause control system 38 requests status information from this application to determine whether the CATV unit is on or off, or whether the television monitor is on or off.

In operation the multi-audio/volume and pause controller 38 needs to know particular information for proper control of the audio generating devices 26a–26c. For example, if the audio generating device is a DVD playing unit, the multi-audio/volume and pause control system 38 determines if the DVD player is on and if so, whether it is playing a movie or some other non-audio generating content. To accomplish this, the multi-audio/volume and pause control system 38 sends a read request to the DVD driver 60 and DVD card 74 to look at the header of the DVD to see what type of information is being played. Also, it is preferred that the multi-audio/volume and pause control system 38 also determines the volume setting of the speakers prior to sending a mute control signal. This is because if the volume setting is beyond a predetermined threshold indicating that the volume is already low enough, the mute or the volume control signal does not need to be generated.

Also, additional options may be implemented with the multi-audio/volume and pause control system 38 so users can flexibly modify the circumstances under which audio is muted. For example, if the modem 46 or telecommunications controller 46 has a caller-id function, the multi-audio/volume and pause control system 38 may be suitably modified so that audio is only muted when a particular call is received.

It will also be understood that other audio mute event signals other than an incoming call signal may be generated and used to mute audio. For example, if the doorbell 35 serves as the audio mute event signal, the multi-audio/volume and pause control system 38 will operate to mute audio or send a pause command signal upon receiving a doorbell activation signal so that the volume would be reduced to facilitate the answering of a door. An automatic reset may be implemented through a keyboard or the user interface remote 30 to reset the audio.

Also, an alarm activation signal from a fire or smoke alarm can serve as the audio mute event signal. Audio can be muted in response to receiving the alarm activation signal so that the alarm can be properly heard. If desired, the multi/audio/volume and pause controller 38 can prioritize volume control commands to reduce volume in emergency situations even if the volume control feature has been disabled for certain rooms or certain audio generating devices.

As described above, the system analyzes the audio source association data and compares the telecommunication location data, the speaker location information data and the audio generating device location data to determine which speaker must be muted. The system then routes the muting signal to the appropriate speaker driver to mute or decrease the volume of the audio being transmitted by the speaker. Where the audio generating device can be paused, the system generates a pause initiation signal and routes the signal to the appropriate audio generating device to set the device in a pause mode.

It will be recognized by those of ordinary skill in the art that the audio card containing the multi/audio volume and pause controller may be adapted to interface with a USB connector or personal computer bus or any other desired bus and that the audio mute and pause controller module may be incorporated as a control module within a USB connector or any other suitable stage of the multimedia system.

It should be understood that the implementation of other variations and modifications of the invention in its various aspects will be apparent to those of ordinary skill in the art, and that the invention is not limited by the specific embodiments described. For example, although the invention has been described as using an audio card, a PC having suitable memory and processing capabilities could also be used to perform the functions of the multi-audio volume and pause controller and audio card. In addition, the same computer may also perform the functions of the audio card. Moreover, a user can define the telecommunications devices to be present in every location so that a volume control signal varies the volume of the selected audio generating device anytime a call is received. In addition, it will be recognized that another computing mechanism other than a personal computer can serve as the main controller. It is therefore contemplated to cover by the present invention, any and all modifications, variations, or equivalents that fall within the spirit and scope of the basic underlying principles disclosed and claimed herein.

What is claimed is:

1. An automatic volume control system for use in a multimedia computer system having at least one speaker and at least one audio generating device comprising:

means for accumulating a status of the audio generating device;

means for receiving an audio mute event notification signal from a notification device; and means, responsive to the accumulating means and the receiving means, for selectively generating a control signal for use in varying the volume to the at least one speaker in response to a detection of the notification signal to selectively control audio from the audio generating device wherein the means for selectively generating the control signal periodically polls a status of each audio device.

2. The automatic volume control system of claim 1 wherein the control signal is a volume level command signal sent to a speaker driver for reducing the volume output by the speaker.

3. The automatic volume control system of claim 1 wherein the selective generating means determines the audio generating device that is a source of the audio and whether the audio generating device generates audio in a non-isochronous manner such that the control signal is a pause command sent to pause the non-isochronous source audio device.

4. The automatic volume control system of claim 1 wherein the means for selectively generating the control signal periodically polls a status of each audio device from present multimedia applications.

5. The automatic volume control system of claim 1 wherein the means for accumulating a status includes registry data indicating all multimedia devices present in the system.

6. The automatic volume control system of claim 1 wherein the audio mute event signal is a call notification signal from an incoming call detection mechanism and the selectively generating means generates a control signal in response to a detection of an incoming call to selectively control audio from the audio generating device.

7. The automatic volume control system of claim 6 wherein the call notification signal is an interrupt signal from a telecommunications application.

8. The automatic volume control system of claim 1 wherein the means for generating a volume control signal accesses a preset audio device data block containing user defined data regarding location information of audio generating devices to determine whether a ringing telecommunications device receiving the incoming call is in a same room as the audio generating device that is generating current audio.

9. The automatic volume control system of claim 7 wherein a volume control signal is not generated if the audio generating device is determined to be pre-defined to a room other than the room associated with the ringing telephone, based on stored audio source association data.

10. The automatic volume control system of claim 6 wherein the means for generating a volume control signal waits until a call pick up signal is received prior to sending the volume control signal unless the means for generating receives a call priority signal indicating that the incoming call is a high priority call whereafter the volume is controlled prior to receiving the call pickup signal.

11. The automatic volume control system of claim 6 including means for generating a subsequent volume control signal to reset a volume level in response to an end call notification signal that the incoming call has ended.

12. An automatic volume control system for use in a multimedia computer system having at least one speaker and multiple audio generating devices comprising:

means for accumulating a status of the multiple audio generating devices;

means for receiving a call notification signal from a telecommunications device coupled to an incoming call detection mechanism;

means, responsive to the accumulating means and the receiving means, for selectively generating a control signal for use in varying the volume to the at least one speaker in response to a detection of an incoming call by analyzing prestored multi-location association data to determine which of the audio generating devices are in a same location as the telecommunications device receiving the incoming call.

13. The automatic volume control system of claim 12 wherein the control signal is a volume level command signal sent to a speaker driver for reducing the volume output by the speaker and wherein the selective generating means determines which audio generating device is a source of the audio and whether the audio generating device generates audio in a non-isochronous manner such that the control signal is a pause command and sent to pause the non-isochronous source audio device instead of reducing the volume output by the speaker.

14. The automatic volume control system of claim 13 wherein the means for selectively generating the control signal periodically polls a status of each audio device from present multimedia applications.

15. The automatic volume control system of claim 14 wherein a volume control signal is not generated if the audio generating device is determined to be pre-defined to a room other than the room associated with the ringing telephone, based on stored audio source association data.

16. The automatic volume control system of claim 15 wherein the system communicates through a universal serial bus (USB) hub connector.

17. The automatic volume control system of claim 15 wherein the audio generating devices include at least one DVD playback system and a television signal receiving circuit.

18. A method for providing automatic volume control for use in a multimedia computer system having at least one speaker and at least one audio generating device comprising:

periodically accumulating a status of the audio generating device and the at least one speaker and reading the status data;

receiving a call notification signal from an incoming call detection mechanism;

determining if the speaker is on based on reading the status data;

determining whether the audio generating device is connected to the speaker based on pre-stored status data; and selectively generating a control signal for use in varying the volume to the at least one speaker in response to a detection of an incoming call to selectively control audio from the audio generating device.

19. The method of claim 18 further comprising the steps of:

receiving and storing a pre-stored status data for each of a plurality of audio generating devices corresponding to a location of a given audio generating device in relation to a location of each telecommunication device that receives incoming calls; and determining which device is a source of the audio during the incoming call and whether the audio generating device generating the audio in a non-isochronous type device such that the control signal is a pause command and is sent to pause the non-isochronous source audio device instead of reducing the volume output by the speaker.

20. The method of claim 18 further comprising the step of waiting until a call pick up signal is received prior to sending the volume control signal unless a received priority signal indicates that the incoming call is a high priority call whereafter the volume is controlled prior to receiving the call pickup signal.

21. The method of claim 18 further comprising the steps of:

storing pre-stored status data relating to multiple speakers defined as being in multiple locations;

determining which speaker is located in a location containing the device generating the audio; and generating the control signal to selectively control the volume for the speaker located in the location containing the device generating the audio.

22. The method of claim 21 further comprising the steps of:

storing pre-stored status data relating to multiple telecommunications devices defined as being in multiple locations;

determining which speaker is located in a location containing the device generating the audio;

determining which telecommunications device is receiving the incoming call and the location containing the device generating the audio; and generating the control signal to selectively control the volume for the speaker located in the location containing the device generating the audio when the telecommunications device receiving the incoming call is in the same location.

* * * * *